United States Patent
Bayley et al.

(10) Patent No.: US 7,513,523 B2
(45) Date of Patent: Apr. 7, 2009

(54) INFLATABLE CURTAIN WITH DIFFERENT SIZE PANELS

(75) Inventors: Gregory S. Bayley, Dryden, MI (US); Paul A. Bowers, Ray, MI (US); Ali Emam Bakhsh, Rochester Hills, MI (US); Ayad G. Nayef, Sterling Heights, MI (US)

(73) Assignee: TRW Vehicle Safety Systems Inc., Washington, DC (US)

( * ) Notice: Subject to any disclaimer, the term of this patent is extended or adjusted under 35 U.S.C. 154(b) by 414 days.

(21) Appl. No.: 11/206,359

(22) Filed: Aug. 18, 2005

(65) Prior Publication Data

US 2007/0040361 A1    Feb. 22, 2007

(51) Int. Cl.
*B60R 21/213* (2006.01)
(52) U.S. Cl. .............................. 280/730.2; 280/743.1
(58) Field of Classification Search .............. 280/730.2, 280/743.1, 729, 743.2
See application file for complete search history.

(56) References Cited

U.S. PATENT DOCUMENTS

| | | | |
|---|---|---|---|
| 6,168,191 B1 * | 1/2001 | Webber et al. | 280/730.2 |
| 6,431,588 B1 | 8/2002 | Bayley et al. | |
| 6,460,877 B2 * | 10/2002 | Tanabe et al. | 280/729 |
| 6,585,293 B2 * | 7/2003 | Keshavaraj | 280/743.1 |
| 6,742,805 B2 * | 6/2004 | Hill | 280/730.2 |
| 6,753,275 B2 * | 6/2004 | Veiga | 442/164 |
| 6,832,776 B1 * | 12/2004 | Soderstrom | 280/730.1 |
| 6,877,768 B2 * | 4/2005 | Fujiwara | 280/730.2 |
| 6,877,771 B2 * | 4/2005 | Weber | 280/742 |
| 6,883,826 B2 * | 4/2005 | Fujiwara | 280/730.2 |
| 6,991,257 B2 * | 1/2006 | Zhao et al. | 280/730.2 |
| 7,000,943 B2 * | 2/2006 | Hasebe et al. | 280/729 |
| 7,066,487 B2 * | 6/2006 | Sullivan et al. | 280/729 |
| 7,125,038 B2 * | 10/2006 | Gammill | 280/728.2 |
| 7,144,038 B2 * | 12/2006 | Keshavaraj | 280/743.1 |
| 7,222,877 B2 * | 5/2007 | Wipasuramonton et al. | 280/730.1 |
| 7,243,940 B2 * | 7/2007 | Tesch et al. | 280/728.1 |
| 2003/0178831 A1 | 9/2003 | Roberts et al. | |
| 2004/0119270 A1 | 6/2004 | Gu et al. | |
| 2005/0098995 A1 * | 5/2005 | Fischer | 280/743.2 |
| 2005/0206138 A1 * | 9/2005 | Breuninger et al. | 280/729 |

* cited by examiner

*Primary Examiner*—Eric Culbreth
*Assistant Examiner*—Nicole Verley
(74) *Attorney, Agent, or Firm*—Tarolli, Sundheim, Covell & Tummino LLP

(57) ABSTRACT

An apparatus (10) for helping to protect an occupant of a vehicle (12) includes an inflatable vehicle occupant protection device (18) that is inflatable to a deployed position between a side structure (32) of the vehicle and a vehicle occupant (34, 36). An inflation fluid source (20) provides inflation fluid for inflating portions of the inflatable vehicle occupant protection device (18). The inflatable vehicle occupant protection device (18) includes a base panel (60) and an attachment panel (62) connected to the base panel. The base panel (60) has a first size. The attachment panel (62) has a second size that is smaller than the first size and a configuration that corresponds to a configuration of the portions of the inflatable vehicle occupant protection device (18) that are to be inflated.

17 Claims, 6 Drawing Sheets

INFLATABLE CURTAIN WITH DIFFERENT SIZE PANELS

FIELD OF THE INVENTION

The present invention relates to an apparatus for helping to protect a vehicle occupant. The apparatus includes a vehicle occupant protection device that is inflated away from a vehicle roof into a deployed position between a vehicle side structure and the vehicle occupant.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of a vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle. The apparatus includes an inflatable vehicle occupant protection device that is inflatable to a deployed position between a side structure of the vehicle and a vehicle occupant. An inflation fluid source provides inflation fluid for inflating portions of the inflatable vehicle occupant protection device. The inflatable vehicle occupant protection device includes a base panel and an attachment panel connected to the base panel. The base panel has a first size. The attachment panel has a second size that is smaller than the first size and a configuration that corresponds to a configuration of the portions of the inflatable vehicle occupant protection device that are to be inflated.

The present invention also relates to an apparatus for helping to protect an occupant of a vehicle that has a side structure and a roof. The apparatus includes an inflatable vehicle occupant protection device that is inflatable away from the vehicle roof to a deployed position between the side structure of the vehicle and a vehicle occupant. The apparatus also includes an inflation fluid source for providing inflation fluid to inflate the inflatable vehicle occupant protection device. The inflatable vehicle occupant protection device includes a base panel including overlying panels interconnected to define a plurality of inflatable chambers. The chambers have respective peripheral portions that are spaced from each other. The inflatable vehicle occupant protection device also includes an attachment panel that has portions interconnected with the peripheral portions of the chambers. The attachment panel extends across at least one space defined between the chambers of said base panel.

BRIEF DESCRIPTION OF THE DRAWINGS

The foregoing and other features of the invention will become apparent to one skilled in the art to which the present invention relates upon consideration of the following description of the invention with reference to the accompanying drawings, in which.

DESCRIPTION OF PREFERRED EMBODIMENTS

Figure 1:
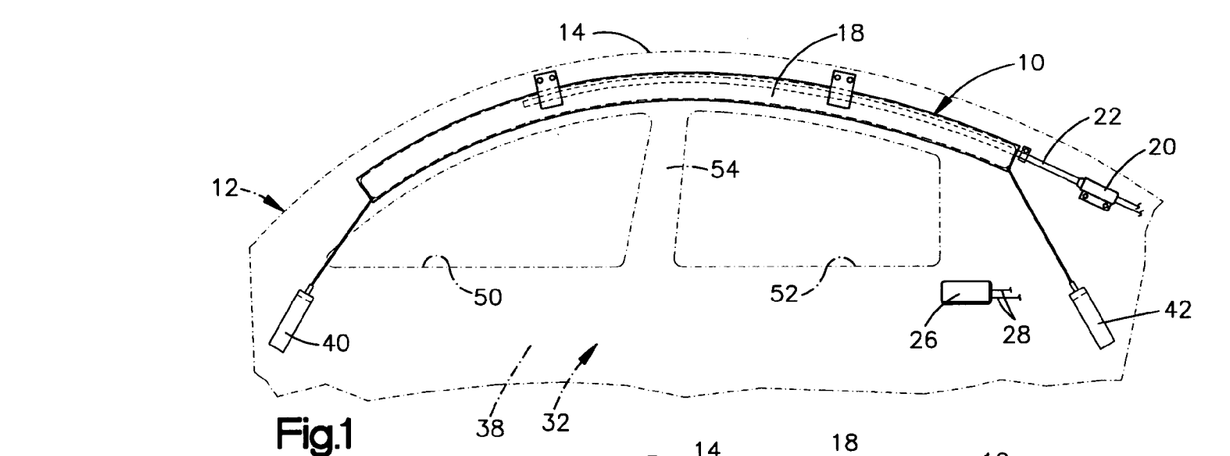
FIG. 1 is a schematic illustration of an apparatus for helping to protect an occupant of a vehicle depicting the apparatus in a stored condition, according to the present invention.

Referring to FIG. 1, an apparatus 10 for helping to protect an occupant of a vehicle 12 has a stored position extending along an intersection of a side structure 32 and a roof 14 of the vehicle 12. The roof 14 can be either a standard roof that is fixed in place or a convertible roof that can be moved or removed. The apparatus 10 includes an inflatable vehicle occupant protection device 18 in the form of an inflatable curtain. An inflation fluid source 20 in the form of an inflator is connected in fluid communication with the inflatable curtain 18 via a fill tube 22. The inflator 20 is actuatable to provide inflation fluid for inflating the inflatable curtain 18.

The inflator 20 may be of any construction suited to provide inflation fluid for inflating the inflatable curtain 18. For example, the inflator 20 may contain a stored quantity of pressurized inflation fluid, in the form of a gas, for inflating the inflatable curtain 18. Alternatively, the inflator 20 may be a pyrotechnic inflator that uses the combustion of gas generating material to generate inflation fluid to inflate the inflatable curtain 18. As another alternative, the inflator 20 may be a hybrid or augmented inflator that uses both a pressurized inflation fluid and a pyrotechnic material to inflate the inflatable curtain 18. As a further alternative, the inflator 20 may include a mixture of inert gas and a flammable gas that is ignitable to generate heat, inflation fluid, or both.

The inflatable curtain 18 includes a base panel or sheet 60 and an attachment panel or sheet 62. The base panel 60 and attachment panel 62 are positioned in an overlying relationship and interconnected to form seams that define an inflatable chamber 64 of the inflatable curtain 18. The seams include a seam that extends along a periphery 68 of the attachment panel 62. The panels 60 and 62 may be interconnected by any suitable means, such as stitching, ultrasonic welding, heat bonding, or weaving the panels as a single piece of material. In the embodiment illustrated in FIGS. 3 and 4, the panels 60 and 62 are interconnected by means 66, such as stitching.

Figure 2:
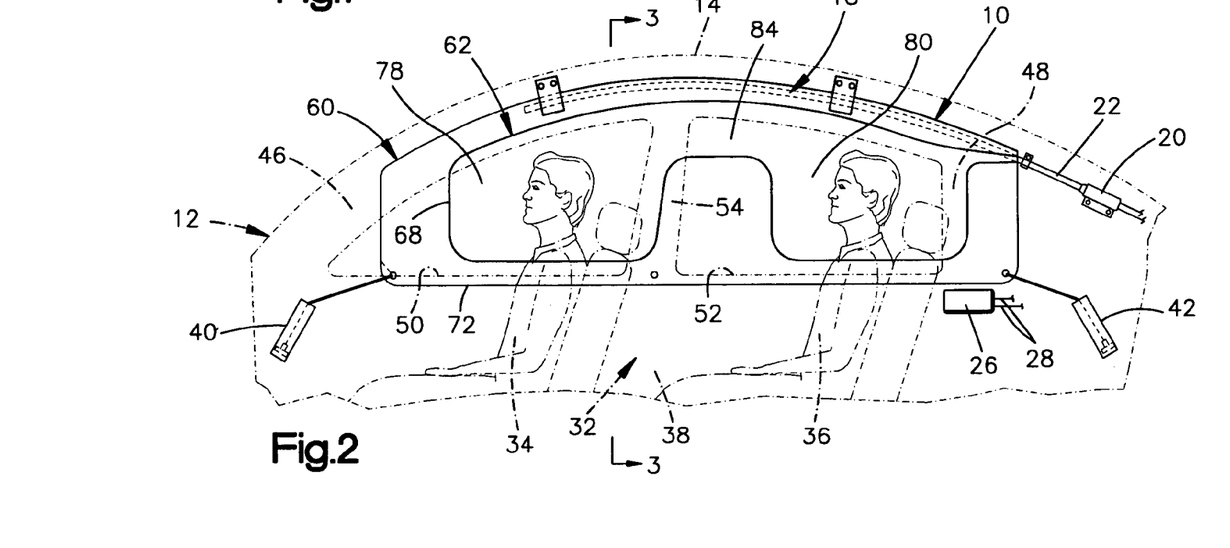
FIG. 2 is a schematic illustration of the apparatus of FIG. 1 depicting the apparatus in a deployed position.
Figure 3:
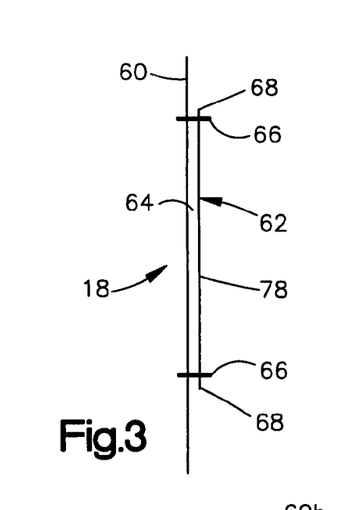
FIG. 3 is a sectional illustration, taken generally along line 3-3 in FIG. 2, depicting the apparatus in a deflated condition.
Figure 4:
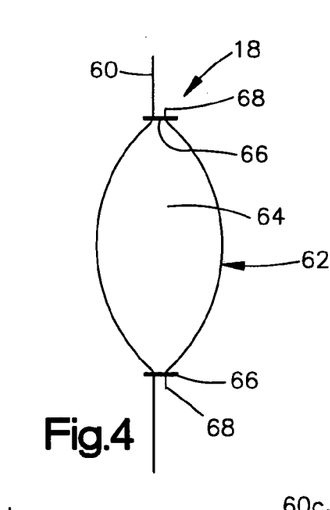
FIG. 4 is a sectional illustration, similar to FIG. 3, depicting the apparatus in an inflated condition.

The base panel 60 and attachment panel 62 illustrated in FIGS. 2-4 are formed by single flat sheets of material. The panels 60 and 62 may be formed of any suitable materials, such as fabrics, elastomers, plastic films, or combinations thereof. For example, the panels 60 and 62 may be formed of a woven fabric, such as nylon, that is coated with a gas impermeable material, such as urethane or silicone, or laminated with a gas impermeable film. Also, the panels 60 and 62 may be formed of a single layer or multiple layers of material. The construction of the base panel 60 can be the same as or different than the construction of the attachment panel 62.

Referring to FIG. 2, the base panel 60 is larger than the attachment panel 62. In the assembled condition of the inflatable curtain 18, the periphery 72 of the base panel 60 extends beyond the periphery 68 of the attachment panel 60 about the entire extent of the periphery of the attachment panel. In this configuration, the periphery 68 of the attachment panel 60 is spaced from a periphery 72 of the base panel 60 throughout the extent of the periphery of the attachment panel. In an alternative construction, the base panel 60 and attachment panel 62 could be connected to each other along their lower edges to form a lower edge of the curtain. As another alternative, the base panel 60 and attachment panel 62 may be formed as a single piece of material that is folded to form a lower edge of the inflatable curtain 18. In this instance, a fold may be formed at a location where a lower edge of the attachment panel 62 is connected with a lower edge of the base panel 60.

The attachment panel 62 has a configuration that corresponds to a configuration of the portions of the inflatable chamber 64 defined between the base panel 60 and the attachment panel. The attachment panel 62 includes a front main portion 78 (FIG. 2) that helps define a portion of the inflatable chamber 64 positioned adjacent the front occupant 34 of the vehicle 12. The attachment panel 62 also has a rear main portion 80 that helps define a portion of the inflatable chamber 64 positioned adjacent the rear occupant 36 of the vehicle 12. A connector portion 84 of the attachment panel 62 extends between the front and rear main portions 78 and 80.

Upon the occurrence of an event for which inflation of the inflatable curtain 18 is desired, such as a side impact to the vehicle 12, a vehicle rollover, or both, a sensor mechanism 26 provides an electrical signal over lead wires 28 to the inflator 20. The electrical signals cause the inflator 20 to be actuated in a known manner. Upon actuation, the inflator 20 discharges fluid under pressure into the fill tube 22. The fill tube directs the inflation fluid into the inflatable curtain 18.

The inflatable curtain 18 inflates under the influence of fluid pressure downward away from the roof 14 of the vehicle 12 to the position illustrated in FIG. 2. In the inflated position, the inflatable curtain 18 extends along the side structure 32 of the vehicle 12 and is positioned between the side structure and occupants 34 and 36 of a passenger compartment 38 of the vehicle.

The inflatable curtain 18, when inflated, may be anchored and tensioned by a front or forward anchoring device 40 and a back or rearward anchoring device 42. The front anchoring device 40 may be connected to the vehicle 12 at or near an A pillar 46 of the vehicle. The rear anchoring device 42 may be connected to the vehicle 12 at or near a C pillar 48 of the vehicle. The anchoring devices 40 and 42 may include devices such as tethers, actuators, or both.

In the inflated position, the inflatable curtain 18 extends from the A pillar 46 to the C pillar 48 and covers the front side window 50, rear side window 52, and a B pillar 54 of the vehicle. The deployed inflatable curtain 18 extends from a location adjacent to the roof 14 of the vehicle 12, downward to adjacent or near lower edges of the side windows 50 and 52. The front and rear anchoring devices 40 and 42 tension the deployed inflatable curtain 18 so that it is pulled taut along the side structure 32 of the vehicle 12. Alternatively, the devices 40 and 42 could be tethers (not shown), in which case the inflatable curtain 18 could be tensioned due to the curtain contracting lengthwise when inflated.

In the inflated and deployed condition, the inflatable chamber 64 is positioned between the side structure 32 and the vehicle occupants 34 and 36. More specifically, the portion of the chamber 64 defined by the front main portion 78 is positioned adjacent the front occupant 34. The portion of the chamber 64 defined by the rear main portion 80 is positioned adjacent the rear occupant 36. In this position, the inflatable curtain 18 may thus absorb and dissipate impact forces with the curtain and help prevent occupant ejection.

The construction of the inflatable curtain 18 in which the base panel 60 is larger than the attachment panel 62 is advantageous. The base panel 60 is configured to cover a relatively large portion of the side structure 32, including the side windows 50 and 52, in order to help prevent occupant ejection. The attachment panel 62, and thus the inflatable chamber 64, is configured to cover portion of the side structure 32 where impacts with the inflatable curtain 18 are likely to occur in order to help absorb or dissipate the force of impacts with the curtain. The inflatable curtain 18 of the present invention is thus configured to help protect an occupant upon the occurrence of a side impact to the vehicle 12, a vehicle rollover, or both.

Since the inflatable curtain 18 has the construction in which the attachment panel 62, and thus the inflatable chamber 64, covers a smaller area than the base panel 60, the curtain may have an inflatable volume that is smaller than a conventional inflatable curtain in which the entire curtain, or a substantial portion of the curtain, is inflated. This helps minimize the size of the inflator 20, which helps reduce costs. Also, since the inflatable volume of the inflatable curtain 18 is reduced, the required volume of inflation fluid may be delivered to the curtain more rapidly, which may facilitate a more rapid deployment of the curtain.

Figure 5:
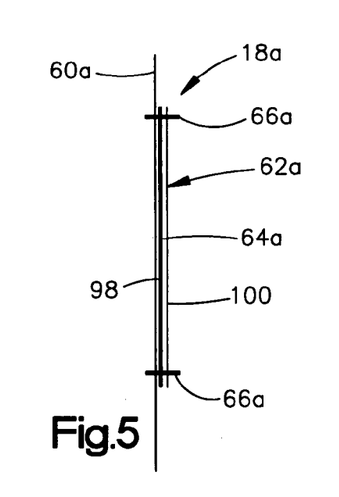
FIGS. 5 and 6 are sectional illustration, similar to FIGS. 3 and 4, depicting a second embodiment of the present invention.
Figure 6:
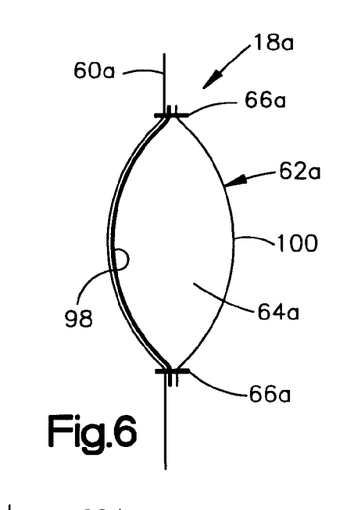

In the embodiment of the invention illustrated in FIGS. 1-4, the attachment panel or structure 62 is formed by a single layer of material. In a second embodiment of the invention illustrated in FIGS. 5 and 6, the attachment panel is formed by a plurality of layers. Since the embodiment of the invention illustrated in FIGS. 5 and 6 is generally similar to the embodiment of the invention illustrated in FIGS. 3-4, similar numerals will be utilized to designate similar components, the suffix letter "a" being associated with the numerals of FIGS. 5 and 6 to avoid confusion.

According to the second embodiment, an inflatable curtain 18a includes a base panel 60a. An attachment panel 62a is connected with the base panel 60a by means 66a, such as stitching, ultrasonic welding, heat bonding, or by weaving the panels as a single piece of material. The stitching 66a forms a substantially fluid tight joint between the attachment panel 62a and base panel 60a.

The attachment panel 62a includes an outer layer 98 that is positioned in engagement with the base panel 60a. In addition, the attachment panel 62a includes an inner layer 100 that is positioned in engagement with the outer layer 98. The outer and inner layers 98 and 100 are formed of the same material as the base panel 60a. If desired, one or more of the attachment panel layers 98 and 100 may be formed of a material that is different than the material of the base panel 60a.

The inner layer 100 has the same configuration as the outer layer 98. The outer and inner layers 98 and 100 are positioned adjacent to the base panel 60a. The size and configuration of the outer and inner layers 98 and 100 corresponds to the configuration of the attachment panel 62 of FIG. 2. Similarly, the size and configuration of the base panel or sheet 60a corresponds to the size and configuration of the base panel 60 of FIG. 2.

An inflatable chamber 64a (FIG. 6) is formed between the outer layer 98 and the inner layer 100. The inflatable chamber 64a has the same configuration as the inflatable chamber 64 of the embodiment illustrated in FIGS. 1-4. The outer and inner layers 98 and 100 of the attachment panel 62a are formed of a substantially gas impermeable material. The base panel 60a could, however, be formed of a material that is gas permeable.

Figure 7:
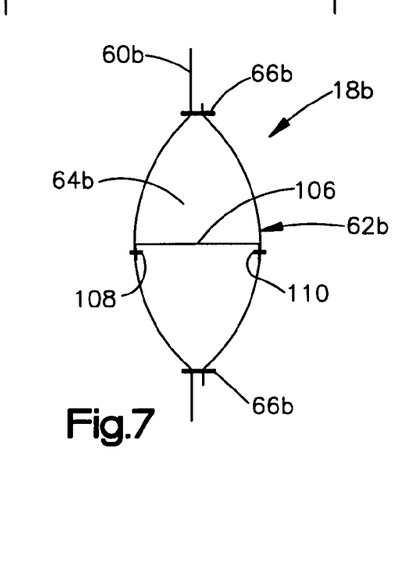
FIG. 7 is a schematic sectional illustration depicting a third embodiment of the present invention.

In the third embodiment of the invention illustrated in FIG. 7, a tether is provided to limit expansion of the inflatable chamber. Since the embodiment of the invention illustrated in FIG. 7 is generally similar to the embodiment of the invention illustrated in FIGS. 1-4, similar numerals will be utilized to designate similar components, the suffix letter "b" being associated with the numerals of FIG. 7 to avoid confusion.

According to the third embodiment, an inflatable curtain 18b includes a base panel 60b. An attachment panel 62b is connected with the base panel 60b by means 66b, such as stitching, ultrasonic welding, heat bonding, or by weaving the panels as a single piece of material. The stitching 66b forms a substantially fluid tight joint between the attachment panel 62b and base panel 60b. The attachment panel 62b has the same general configuration as the attachment panel 62 of the embodiment of FIGS. 1-4.

A tether 106 is connected with the base panel 60b (FIG. 7) by means 108, such as stitching, ultrasonic welding, or heat bonding. The tether 106 is connected with the attachment panel 62b by means 110, such as stitching, ultrasonic welding, or heat bonding. The tether 106 is constructed of the same material as the base panel 60b and attachment panel 62b or of a material different than that used to construct the base panel and attachment panel.

The inflation fluid from the inflator is directed into an inflatable chamber 64b formed between the attachment panel 62b and base panel 60b. The tether 106 limits the extent of relative movement between the attachment panel 62b and the base panel 60b. Although only a single tether 106 has been illustrated in FIG. 7, it will be understood and appreciated that a plurality of tethers may be provided to connect the base panel 60b to the attachment panel 62b.

Figure 8:
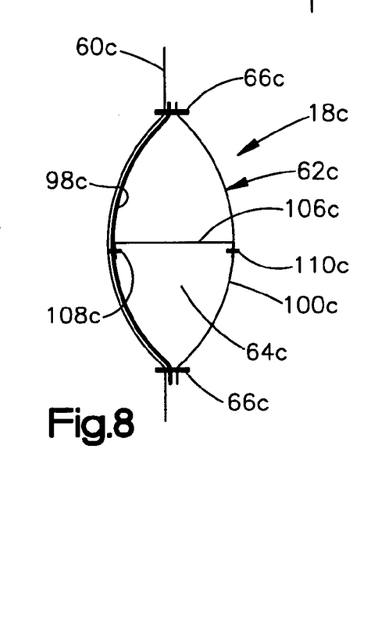
FIG. 8 is a schematic sectional illustration depicting a fourth embodiment of the present invention.

In the fourth embodiment of the invention illustrated in FIG. 8, a tether is provided between layers of a multi-layered attachment panel. Since this embodiment of the invention illustrated in FIG. 8 is generally similar to the embodiments of the invention illustrated in FIGS. 1-7, similar numerals will be utilized to identify similar components, the suffix letter "c" being associated with the embodiment of the invention illustrated in FIG. 8.

According to the fourth embodiment, an inflatable curtain 18c includes a base panel 60c and an attachment panel 62c. The attachment panel 62c is connected to the base panel 60c by means 66c, such as stitching, ultrasonic welding, heat bonding, or by weaving the panels together.

The attachment panel 62c includes an outer layer 98c and an inner layer 100c. An inflatable chamber 64c is formed between the outer layers 98c and 100c. The base panel 60c is of the same general size and configuration as the base panel 60 of FIG. 2. Similarly, the attachment panel 62c is of the same general size and configuration as the attachment panel 62 of FIG. 2.

A tether 106c has an end portion connected to the outer layer 98c by means 108c, such as stitching, ultrasonic welding, or heat bonding. Similarly, the tether 106c has an end portion connected to the inner layer 100c by means 110c, such as stitching, ultrasonic welding, or heat bonding. The tether 106c is effective to transmit force between the outer layer 98c and inner layer 100c to restrict transverse expansion of the inflatable curtain 18c under the influence of fluid pressure in the inflatable chamber 64c.

Figure 9:
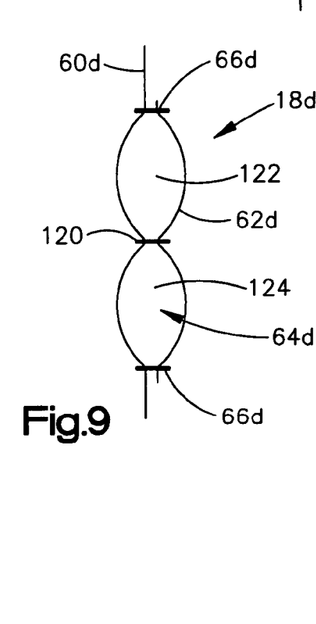
FIG. 9 is a schematic sectional illustration depicting a fifth embodiment of the present invention.

In the fifth embodiment of the invention illustrated in FIG. 9, the base panel and attachment panel are interconnected within their peripheries. Since the embodiment of the invention illustrated in FIG. 9 is generally similar to the embodiment of the invention illustrated in FIGS. 1-8, similar numerals will be utilized to designate similar components, the suffix letter "d" being associated with the numerals of FIG. 9 to avoid confusion.

According to the fifth embodiment, the inflatable curtain 18d includes a base panel 60d and an attachment panel 62d. The attachment panel 62d may be formed of a plurality of layers (e.g., in a manner similar to that illustrated in FIGS. 5 and 6) or could be formed as a single layer. The attachment panel 62d is secured to the base panel 60d by means 66d, such as stitching, ultrasonic welding, heat bonding, or by weaving the panels as a single piece of material.

Means 120, such as stitching, ultrasonic welding, or heat bonding connects the attachment panel 62d to the base panel 60d. The means 120 helps define an inflatable chamber 64d separated into an upper portion 122 and a lower portion 124. Although the means 120 is illustrated in FIG. 9 as a single stitch line, it is contemplated that a plurality of stitch lines may be provided to divide the inflatable chamber 64d into a plurality of portions.

The means 120 (FIG. 9) may be a single stitch or a plurality of stitches that form a seam that extends in any desired direction relative to the base panel 60d and attachment panel 62d. For example, the seam may extend vertically, horizontally, or at a diagonal relative to the generally horizontal lower edge of the deployed base panel 60d.

Figure 10:
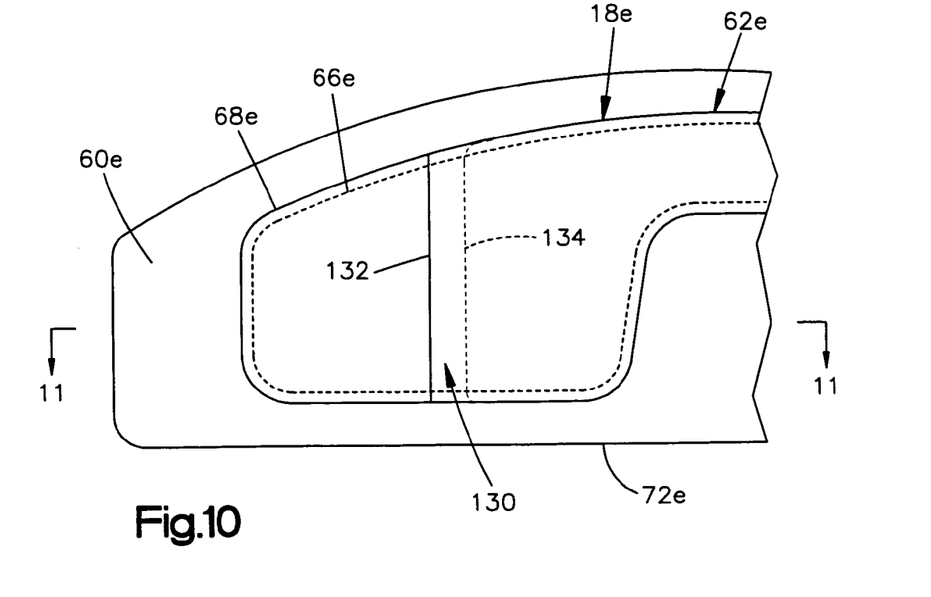
FIGS. 10-12 are schematic illustrations depicting a sixth embodiment of the present invention.
Figure 11:
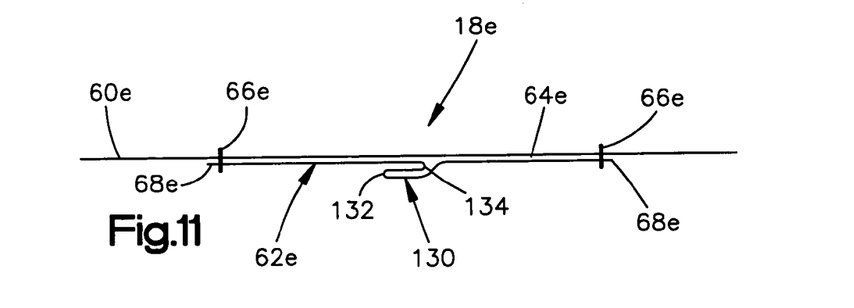
Figure 12:
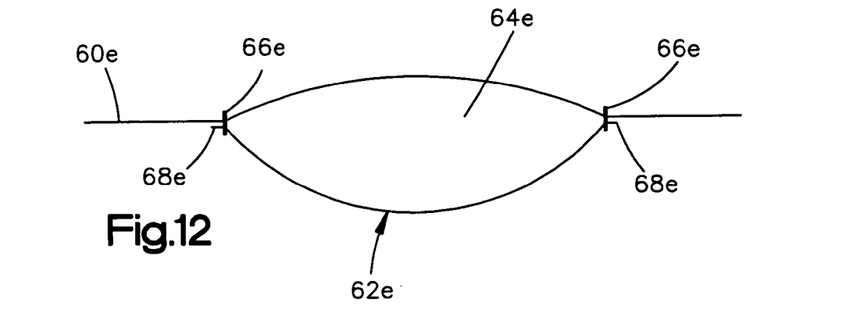

In the sixth embodiment of the invention illustrated in FIGS. 10-12, the attachment panel is folded or pleated to provide additional material to accommodate expansion of the attachment panel. Since the embodiment of the invention illustrated in FIG. 10 is generally similar to the embodiment of the invention illustrated in FIGS. 1-9, similar numerals will be utilized to designate similar components, the suffix letter "e" being associated with the numerals of FIGS. 10-12 to avoid confusion.

According to the sixth embodiment, an inflatable curtain 18e (FIGS. 10-12) includes a base panel 60e and an attachment panel 62e. The attachment panel 62e is connected with the base panel 60e by means 66e, such as stitching, ultrasonic welding, heat bonding, or weaving the panels as a single piece of material. The means 66e forms a seam extending along the periphery 68e of the attachment panel 62e. The seam 66e and periphery 68e of the attachment panel 62e are spaced from the periphery 72e of the base panel 60e.

A pleat 130 (FIGS. 10 and 11) is formed in the attachment panel 62e by doubling the material of the attachment panel 62e over on itself, thus forming folds 132 and 134 in the attachment panel 62e. The folds 132 and 134 and the pleat 130 extend between upper and lower (as viewed in FIG. 10) peripheral edge portions of the attachment panel 62e. However, if desired, the folds 132 and 134 and pleat 130 may extend horizontally (as viewed in FIG. 10) across the attachment panel 62e or diagonally relative to the lower edge portion 72e of the base panel 60e.

When inflation fluid is directed into an inflatable chamber 64e (FIGS. 11 and 12) formed between the base panel 60e and attachment panel 62e, the attachment panel is expanded outward away from the base panel and the pleat 130 is unfolded (FIG. 12). The pleat 130 provides additional material in the attachment panel 62e to enable the attachment panel to bulge, swell, or billow, away from the base panel 60e as the inflatable curtain 18e is inflated.

Figure 13:
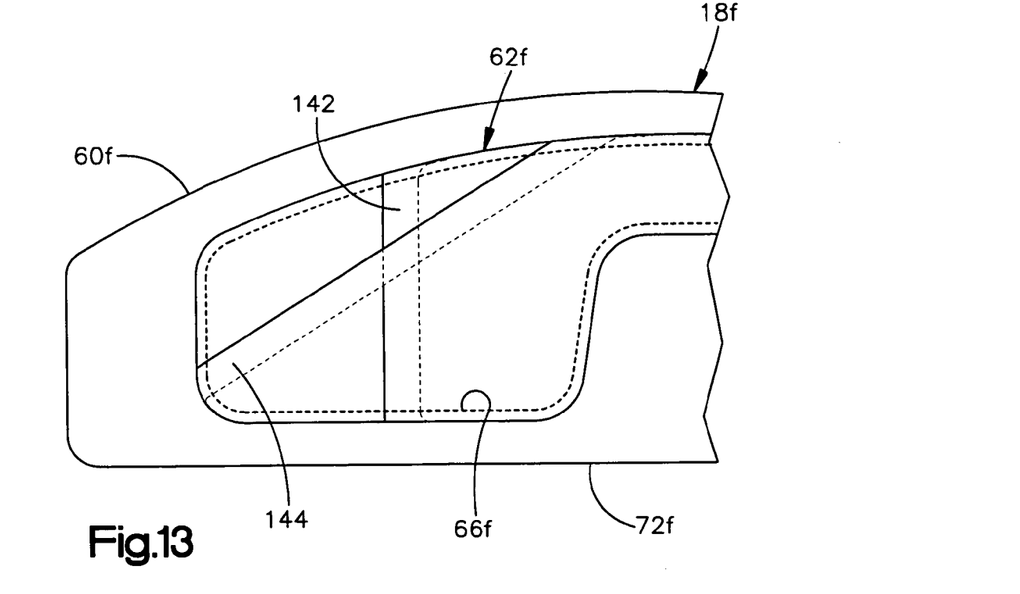
FIG. 13 is a schematic illustration depicting a seventh embodiment of the present invention.

In the seventh embodiment of the invention illustrated in FIG. 13, a plurality of pleats are provided in the attachment panel. Since the embodiment of the invention illustrated in FIG. 13 is generally similar to the embodiment of the invention illustrated in FIGS. 1-12, similar numerals will be utilized to designate similar components, the suffix letter "f" being associated with the numerals of FIG. 13 to avoid confusion.

According to the seventh embodiment, an inflatable curtain 18f (FIG. 13) includes a base panel 60f that is anchored at longitudinally opposite ends to a vehicle at locations adjacent to the A and C pillars in the vehicle. An attachment panel 62f is connected to the base panel 60f by suitable means 66f, such as stitching, ultrasonic welding, heat bonding, or by weaving the panels as a single piece of material. The attachment panel 62f cooperates with the base panel 60f to form an inflatable chamber that is connected in fluid communication with an inflation fluid source (not shown) via a fill tube (not shown).

The attachment panel 62f is provided with first and second pleats 142 and 144, respectively, that are formed in the attachment panel by doubling the material of the attachment panel over on itself, thus forming folds in the attachment panel. The first pleat 142 is intersected by the second pleat 144. The second pleat 144 extends diagonally relative to a peripheral edge portion 72f of the base sheet 60f while the first pleat 142 extends perpendicular to the peripheral edge portion 72f of the base panel 60f.

If desired, additional pleats (not shown) may be formed in the attachment panel 62f. For example, a plurality of pleats extending parallel to the first pleat 142 may be formed in the attachment panel 62f. If desired, a plurality of pleats may be provided in the attachment panel 62f extending parallel to the second pleat 144. Although the folds forming the second pleat 144 extend at an acute angle to the folds forming the first pleat 142, the second pleat may be oriented such that the folds extend perpendicular to the folds of the first pleat.

Figure 14:
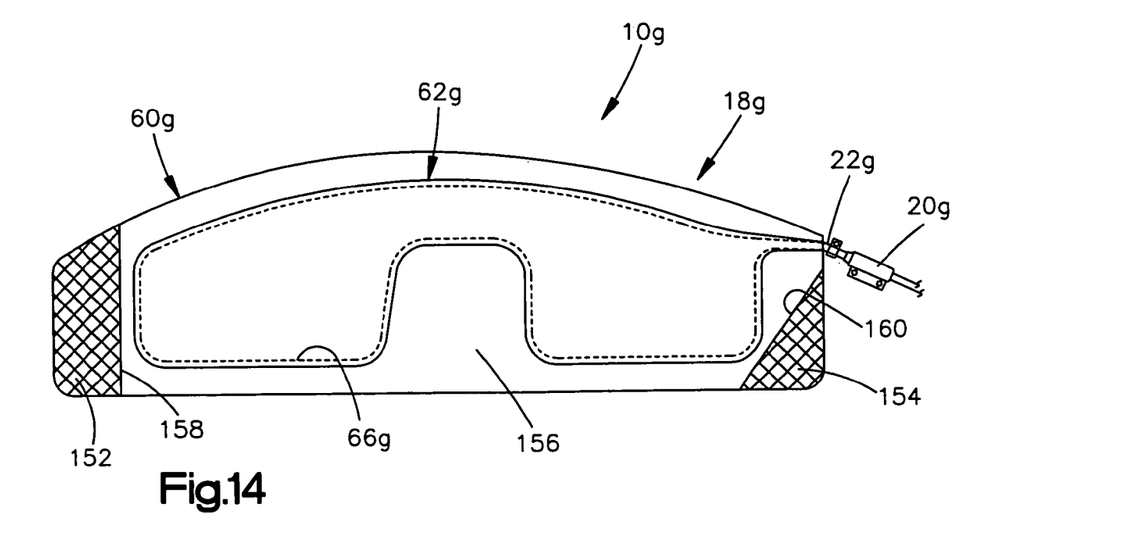
FIG. 14 is a schematic illustration depicting a eighth embodiment of the present invention.

In the embodiments of the invention illustrated in FIGS. 1-13, the base panel 60 is formed as a single piece of material. In the eighth embodiment of the invention illustrated in FIG. 14, the base panel is formed of a plurality of pieces of material. Since the embodiment of the invention illustrated in FIG. 14 is generally similar to the embodiments of the invention illustrated in FIGS. 1-4, similar numerals will be utilized to designate similar components, the suffix letter "g" being associated with the numerals of FIG. 14 to avoid confusion.

According to the eighth embodiment, an apparatus 10g includes an inflatable curtain 18g. The inflatable curtain 18g is connected in fluid communication with an inflator 20g via a fill tube 22g. The inflatable curtain 18g includes a base panel 60g and an attachment panel 62g. The attachment panel 62g is connected to the base panel 60g by suitable means 66g, such as stitching, ultrasonic welding, heat bonding, or by weaving the panels as a single piece of material. The attachment panel 62g and the base panel 60g help define an inflatable chamber.

The base panel 60g includes a plurality of pieces of material that are interconnected to form the base panel. In the embodiment illustrated in FIG. 14, the base panel 60g includes a forward or front portion 152 and a rearward or back portion 154. The base panel 60g also includes a main or central portion 156 to which the forward and rearward portions 152 and 154 are connected.

The front portion 152 is connected to the main portion 156 by a front seam 158. The rear portion 154 is connected to the main portion 156 by a rear seam 160. The front and rear seams 158 and 160 may be formed in any suitable manner, such as stitching, ultrasonic welding, heat bonding.

The front and rear portions 152 and 154 of the base panel 60g are formed of a material that is different than the material used to form the main portion 156. This enables the material for the front and rear portions 152 and 154 to be selected based on specific needs of the particular parts of the inflatable curtain 18g. The forward and rearward portions 152 and 154 could be formed of the same material or different materials.

A ninth embodiment of the invention is illustrated in FIGS. 15-18. Since the embodiment of the invention illustrated in FIGS. 15-18 is generally similar to the embodiments of the invention illustrated in FIGS. 1-4, similar numerals will be utilized to designate similar components, the suffix letter "h" being associated with the numerals of FIGS. 15-18 to avoid confusion.

Figure 15:
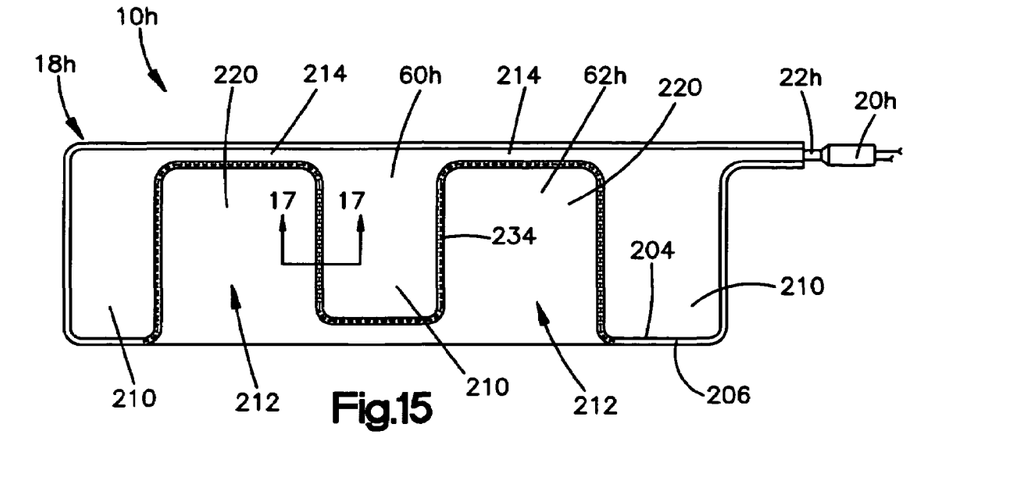
FIG. 15 is a schematic illustration depicting a ninth embodiment of the present invention.

According to the ninth embodiment, an apparatus 10h includes an inflatable curtain 18h. Referring to FIG. 15, the inflatable curtain 18h is connected in fluid communication with an inflator 20h via a fill tube 22h. The inflatable curtain 18h includes a base panel 60h and an attachment panel 62h. The attachment panel 62h is connected to the base panel 60h to form the inflatable curtain 18h.

Figure 17:
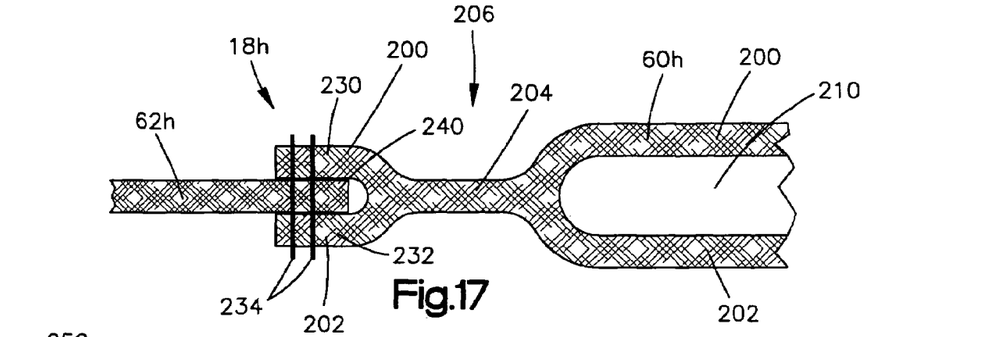
FIG. 17 is a sectional view of the ninth embodiment taken generally along line 17-17 in FIG. 15.

In the ninth embodiment, the base panel 60h has one piece woven construction in which overlying panels 200 and 202 (see FIG. 17) are woven as one piece of material with a single layer of material 204 that extends along a periphery 206 of the base panel. The panels 200 and 202 could be interconnected by alternative means (not shown), such as stitching, ultrasonic welding, or heat bonding. Referring to FIG. 17, the one piece woven construction of the base panel 60h is configured to leave separate peripheral portions 230 and 232 of the panels 200 and 202, respectively.

Figure 16:
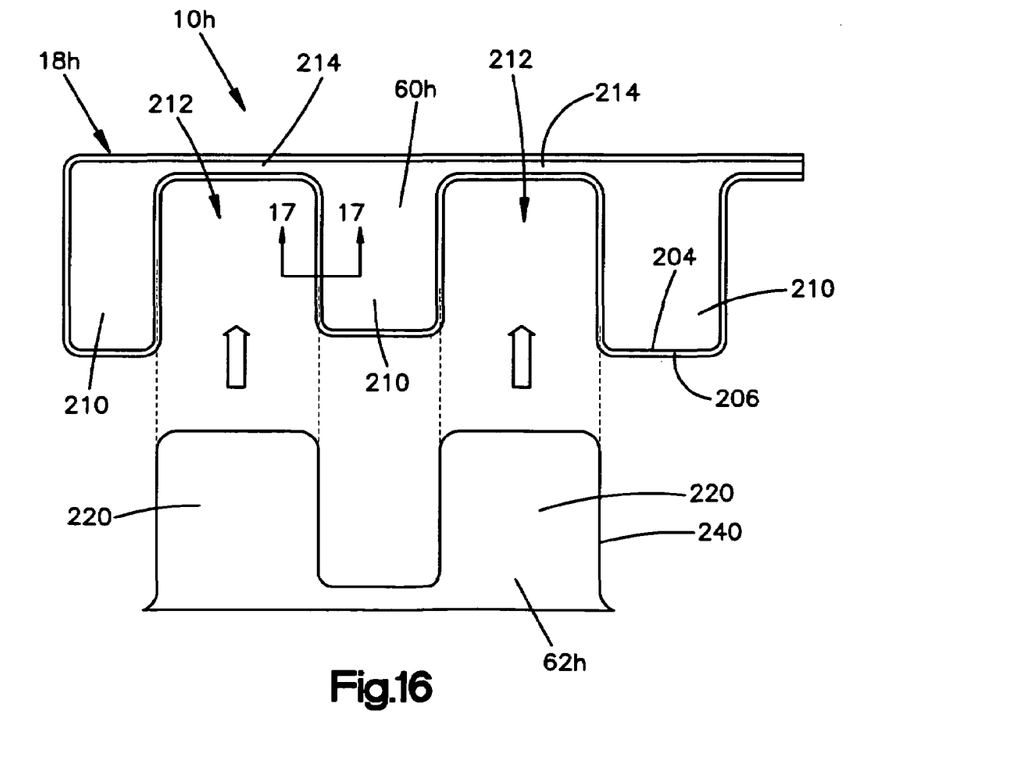
FIG. 16 is an exploded view of portions of the apparatus of the ninth embodiment.

The single layer of material 204 helps define at least one inflatable chamber 210 of the inflatable curtain 18h. As best shown in FIGS. 15 and 16, the base panel 60h has a configuration in which the chambers 210 are spaced from each other, defining spaces 212 between the chambers. Fluid communication between the chambers 210 is established via passages 214 that extend along the upper portion of the base panel 60h.

The attachment panel 62h has a configuration that corresponds to and complements the configuration of the inflatable chambers 210 of the inflatable curtain 18h. As shown in FIGS. 15 and 16, the attachment panel 62h includes portions 220 that are configured and arranged to coincide with the spaces 212 between the chambers 210 of the base panel 60h.

In the embodiment illustrated in FIGS. 15-18, the attachment panel 62h is connected to the base panel 60h by stitching 234. As shown in FIG. 17, the attachment panel 62h has a peripheral portion 240 that is positioned between the peripheral portions 230 and 232 of the panels 200 and 202 of the base portion 60h. The stitching 234 extends through the peripheral portions 230 and 232 and through the peripheral portion 240 and thereby connects the attachment panel 62h to the base panel 60h. When the attachment panel 62h is connected to the base panel 60*h*, the portions 220 extend across and fill the spaces 212 between the chambers 210 of the base panel 60*h*.

The attachment panel 62*h* may be connected to the base panel 60*h* by alternative means (not shown), such as adhesives, ultrasonic welding, or heat bonding. For example, the peripheral portion 240 of the attachment panel 62*h* could be placed between the peripheral portions 230 and 232 of the panels 200 and 202. The peripheral portions 230, 232, and 240 could then be interconnected by ultrasonic welding or heat bonding.

Figure 18:
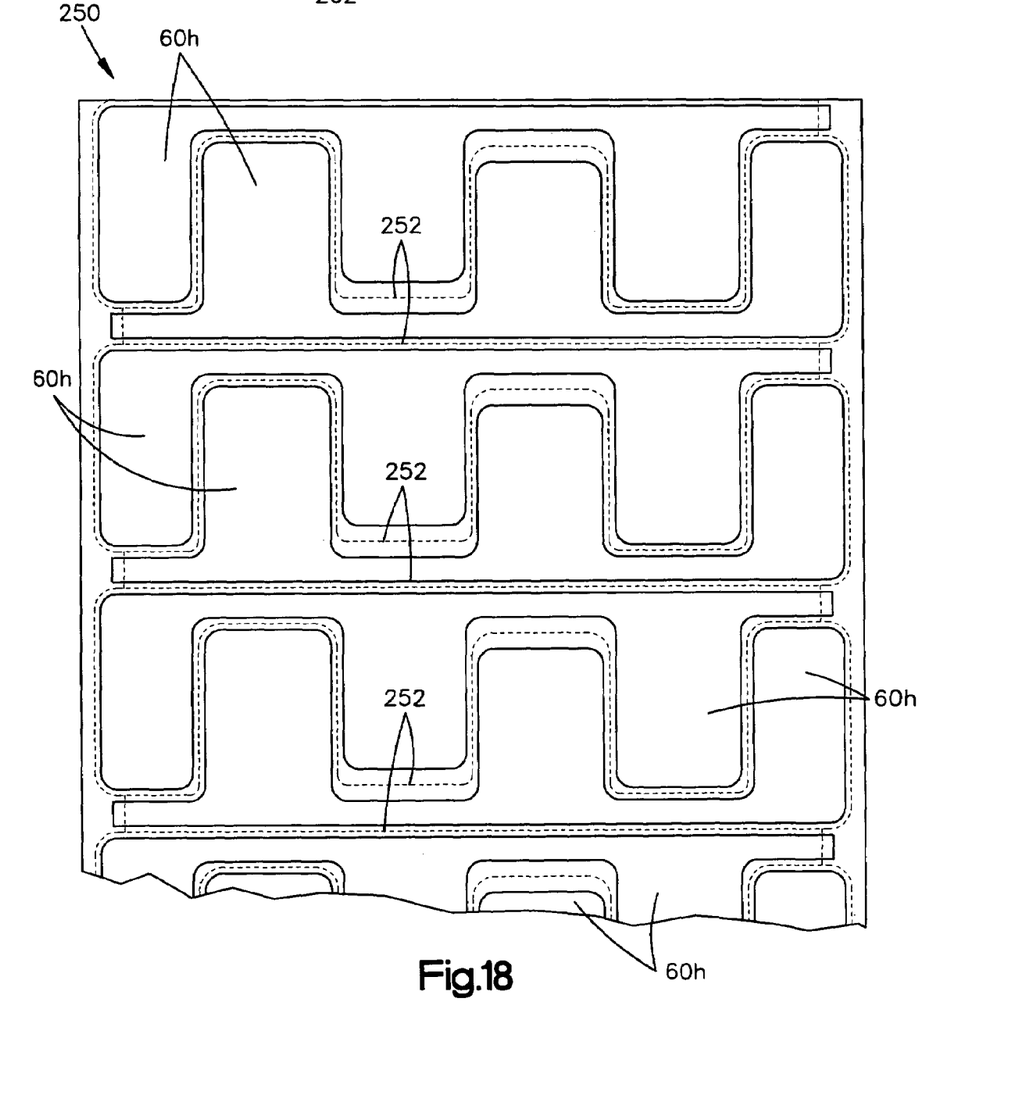
FIG. 18 is a plan view illustrating the manufacture of a portion of the apparatus of the ninth embodiment.

The ninth embodiment of the invention shown in FIGS. 15-18 advantageously helps minimize the amount of material used to construct the inflatable curtain 18*h* and the amount of waste material incurred during manufacture of the curtain. As shown in FIG. 18, the base panel 60*h* has a configuration conducive to weaving multiple base panels in a nested configuration. In this configuration, multiple base panels 60*h* can be woven in a sheet 250 with the chambers of one base panel positioned in the spaces between the chambers of an adjacent base panel. The sheet 250 can be cut along cut lines 252 to separate the individual base panels 60*h* from the sheet. As shown by the cut lines 252, a very small amount of material will be sacrificed as waste when the base panels 60*h* are cut from the sheet 250.

The configuration of the attachment panel 62*h*, which corresponds to and is complementary to that of the base panel 60*h*, also helps minimize the amount of material used to construct the inflatable curtain 18*h* and the amount of waste material incurred during manufacture of the curtain. The attachment panel 62*h*, having the configuration best shown in FIG. 16, can be cut from a sheet of material in a nested fashion similar to that of the base panel 60*h*.

The construction of the inflatable curtain 18*h*, separating the attachment panel 62*h* from the base panel 60*h*, may also help reduce the overall amount of material included in the finished curtain. The attachment panel 62*h*, being separate from the base panel 60*h*, may have a lower weave density (e.g., yarns per inch) than the base panel and thus may reduce the amount of yarn required to produce the inflatable curtain 18*h*. In a construction where the base panel 60*h* and attachment panel 62*h* are woven together in a one-piece woven construction, it may not be feasible to weave the attachment panel with such a reduced weave density. The construction of the inflatable curtain 18*h* shown in FIGS. 15-18 may thus provide coverage similar or identical to coverage of a one-piece woven curtain while using less material.

From the above description of the invention, those skilled in the art will perceive improvements, changes, and modifications. Such improvements, changes, and modifications within the skill of the art are intended to be covered by the impended claims.

Having described the invention, the following is claimed:

1. An apparatus for helping to protect an occupant of a vehicle that has a side structure and a roof, said apparatus comprising:
    an inflatable vehicle occupant protection device that is inflatable away from the vehicle roof to a deployed position between the side structure of the vehicle and a vehicle occupant; and
    an inflation fluid source for providing inflation fluid to inflate portions of said inflatable vehicle occupant protection device;
    said inflatable vehicle occupant protection device including a base panel and an attachment panel connected to said base panel, said base panel having a first size, said attachment panel having a second size that is smaller than the first size and a configuration that corresponds to a configuration of portions of said inflatable vehicle occupant protection device that are to be inflated, said inflatable vehicle occupant protection device being inflated only in said portions.

2. An apparatus as set forth in claim 1, wherein said base panel extends along the side structure of the vehicle between an A pillar and a C pillar of the vehicle when said portions of said inflatable vehicle occupant protection devices are inflated, said attachment panel extending along the side structure of the vehicle for a distance that is less than the extent of said base panel when said portions of said inflatable vehicle occupant protection device are inflated.

3. An apparatus as set forth in claim 1, wherein said attachment panel has a periphery that is spaced from a periphery of said base panel throughout the extent of the periphery of said attachment panel.

4. An apparatus as set forth in claim 1, further including a front anchor connected with a first end portion of said base panel to anchor said first end portion of said base panel at a front portion of a passenger compartment in the vehicle when the portions of said inflatable vehicle occupant protection device are inflated and a rear anchor connected with a second end portion of said base panel to anchor said second end portion of said base panel at a rear portion of the passenger compartment in the vehicle when the portions of said inflatable vehicle occupant protection device are inflated.

5. An apparatus as set forth in claim 1, wherein said base panel extends along the vehicle side structure from a location above window openings in the vehicle side structure to a location below the window openings in the side structure when said inflatable vehicle occupant protection device is in the deployed position.

6. An apparatus as set forth in claim 1, wherein said attachment panel includes an outer layer that is disposed adjacent said base panel and an inner layer that is disposed adjacent said outer layer, said inflation fluid source being connected in fluid communication with a space disposed between said inner and outer layers when the portions of said inflatable vehicle occupant protection device are inflated.

7. An apparatus as set forth in claim 6, further including a tether having a first portion that is connected to said outer layer and a second portion that is connected to said inner layer, said tether extending across the space between said inner and outer layers when the portions of said inflatable vehicle occupant protection device are inflated.

8. An apparatus as set forth in claim 1, further including a tether having a first portion that is connected to said base panel and a second portion that is connected to said attachment panel, said tether extending across a space between said base panel and said attachment panel when the portions of said inflatable vehicle occupant protection device are inflated.

9. An apparatus as set forth in claim 1, further including fastening means for connecting said attachment panel with said base panel at a location spaced from a peripheral portion of said attachment panel.

10. An apparatus as set forth in claim 1, wherein said attachment panel includes a pleat that extends between first and second peripheral edge portions of said attachment panel, said pleat being at least partially removed from said attachment panel when the portions of said inflatable vehicle occupant protection device are inflated.

11. An apparatus as set forth in claim 1, wherein said attachment panel includes a plurality of pleats that extend between peripheral edge portions of said attachment panel, said plurality of pleats being at least partially removed from said attachment panel when the portions of said inflatable vehicle 12. An apparatus as set forth in claim 1, wherein said attachment panel includes a first pleat that extends between peripheral edge portions of said attachment panel and a second pleat that extends between peripheral edge portions of said attachment panel, said second pleat intersecting said first pleat, said first and second pleats being at least partially removed from said attachment panel when the portions of said inflatable vehicle occupant protection device are inflated.

13. An apparatus as set forth in claim 1, wherein said base panel is formed of fabric that has a uniform construction throughout the extent of the fabric.

14. An apparatus as set forth in claim 1, wherein said base panel includes a plurality of interconnected portions, a first one of said plurality of interconnected portions having a first construction and a second one of said interconnected portions having a second construction different than the first construction.

15. An apparatus as set forth in claim 1, wherein said base panel comprises overlying panels interconnected to define a plurality of inflatable chambers of said inflatable vehicle occupant protection device, said attachment panel being connectable with peripheral portions of said base panel, said attachment panel having portions that extend across at least one space between said inflatable chambers.

16. An apparatus as set forth in claim 15, wherein base panels are configured for being woven in a sheet in which the inflatable chambers of one of said base panels are positioned in the space between inflatable chambers of an adjacent base panel.

17. An apparatus as set forth in claim 15, wherein attachment panel has a peripheral portion positioned between peripheral portions of said overlying panels of said base panel, said apparatus further comprising stitching extending through said peripheral portions of said overlying panels and through said peripheral portion of said attachment panel to interconnect said base panel and said attachment panel.

* * * * *

UNITED STATES PATENT AND TRADEMARK OFFICE
CERTIFICATE OF CORRECTION

PATENT NO. : 7,513,523 B2  Page 1 of 1
APPLICATION NO. : 11/206359
DATED : April 7, 2009
INVENTOR(S) : Gregory S. Bayley et al.

It is certified that error appears in the above-identified patent and that said Letters Patent is hereby corrected as shown below:

Column 11, Line 3 after "vehicle" insert --occupant protection device are inflated.--

Signed and Sealed this

Second Day of June, 2009

JOHN DOLL
*Acting Director of the United States Patent and Trademark Office*